Dec. 18, 1956 M. H. DAZEY 2,774,937
METHOD OF MEASURING Q
Filed June 3, 1953

INVENTOR.
MITCHELL H. DAZEY
BY
ATTORNEY.

United States Patent Office 2,774,937
Patented Dec. 18, 1956

2,774,937

METHOD OF MEASURING Q

Mitchell H. Dazey, Palos Verdes Estates, Calif., assignor to the United States of America as represented by the United States Atomic Energy Commission Application June 3, 1953, Serial No. 359,269

2 Claims. (Cl. 324—58)

The present invention relates to an improved method and apparatus for electrical testing particularly adapted for determining the Q of a resonant cavity or circuit.

In addition to normal electrical measurements it is of importance in resonant circuits to determine the Q of the circuit, and Q may be defined as the ratio of inductive reactance to effective resistance. There are known a variety of methods for determining Q; however, these require precise measurements of voltage or frequency values which for high frequency work are not readily measured with any degree of accuracy. Thus the decrement method may be employed wherein measurements are made of the resonant frequency and the time interval during which a measured reduction in the decaying oscillation takes place, or the bandwidth method may be used wherein the frequency must be determined at resonance and at the .707 excitation levels. Formerly the bandwidth method has been limited to use with relatively low resonant frequencies for it has not been possible to make the requisite frequency determinations with sufficient accuracy at higher resonant frequencies, and thus other and more complicated methods have been employed. The present invention provides an improved method and apparatus for determining the Q of a resonant circuit or cavity generally employing the bandwidth principle but obviating the previously required difficult frequency determinations that formerly limited the applicability of the method.

Accordingly, it is an object of the present invention to provide an improved method of determining the Q of a resonant circuit or cavity.

It is another object of the present invention to provide an improved method of measuring the frequency difference between the frequencies at which the oscillations in a resonant circuit are .707 of resonant intensity.

It is a further object of the present invention to provide method of measuring Q and measuring a frequency difference as the bandwidth without requiring absolute frequency determinations.

Various other possible objects and advantages of the invention will become apparent to those skilled in the art from the following description of the method and apparatus taken together with the attached drawings illustrating a preferred embodiment of the apparatus. In the drawings.

Figure 1:
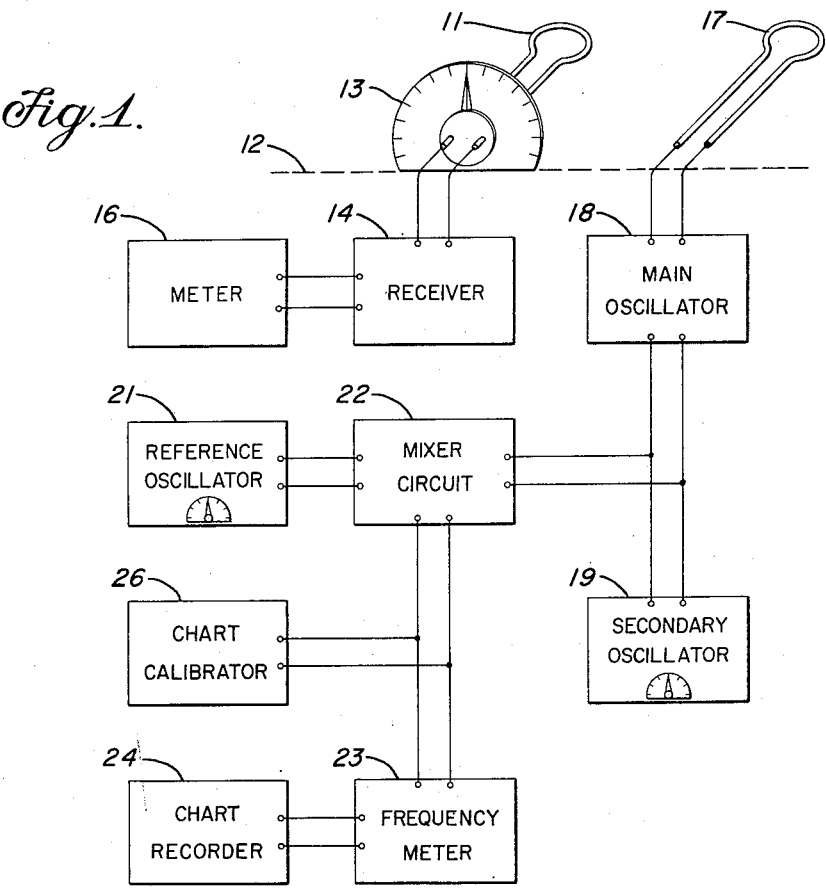
Figure 1 is a block diagram of the circuit of the preferred embodiment of the apparatus in accordance with the invention.

With regard to the theory upon which the invention is based, the so-called bandwidth method makes use of the relationship:

$$Q = \frac{f_R}{f_1 - f_2}$$

where $f_R$ is the resonant frequency and $f_1$ and $f_2$ are the frequencies at which the field intensity is .707 of peak value. This relationship is quite useful inasmuch as only frequency measurements are required for the determination of Q and this method has been widely employed in low frequency work. However, with a very high frequency resonance, say 100 megacycles/sec. the bandwidth $(f_1 - f_2)$ cannot be readily determined as it may be of the order of 2000 cycles and such a measurement would require an accuracy much greater than one percent. Inherent circuit limitations preclude the requisite accuracy of measurement with conventional means so that this method could not previously be employed with high frequency resonant circuits or cavities; however, the present invention provides method and means for readily determining the bandwidth with the desired accuracy.

The method of the present invention may be generally defined as follows. A resonant cavity, for example, is energized and the frequency of the energizing signal is varied until the resonant frequency is attained as indicated by the production of a maximum field within the cavity. Preferably the energizing signal is composed of two signals whose frequencies are added together and the fundamental or primary frequency is much the larger with a smaller modulating or secondary frequency being added thereto. There then follows the step of subtracting from the secondary frequency signal a reference frequency signal which is set very close to the same frequency as the modulating frequency and which is standardized so as to be invariable. There is produced by this subtraction a signal having a frequency equal to the difference between the reference frequency and the secondary frequency. The next step is to vary the frequency of the secondary frequency signal so that the frequency of the cavity energizing signal is varied and the frequency is increased and then decreased until the cavity is energized at .707 field intensity at frequencies above and below the cavity resonance frequency. The change in frequency of the difference frequency between the two .707 field intensity points is recorded as the cavity bandwidth and the Q of the cavity may then be readily calculated by dividing the bandwidth by the resonant frequency.

It will be seen from the foregoing that there is measured a small frequency difference between two very high frequencies and that this measurement is accomplished with a high degree of accuracy inasmuch as only frequency change is actually measured. Any attempt to vary the frequency of a master frequency signal generator over the very small bandwidth of a resonant cavity, for example, could not be accomplished with the requisite degree of accuracy; however, by employing the comparison method of the present invention the bandwidth is readily measured within a few cycles with a resonant frequency of the order of one hundred megacycles.

There is illustrated in the accompanying drawing means for accomplishing the above-described steps of the invention and referring thereto, there is shown a pickup loop 11 disposed within a cavity resonator 12 represented in part by a dashed line. Loop 11 is mounted for rotation in the wall of the cavity, as by a goniometer 13, and is electrically connected exteriorly of the cavity to a conventional receiver unit 14, such as a radio receiver, that produces electrical signals having a magnitude proportional to the field within the cavity 12. The signals from receiver 14 are applied to a meter 16 which thereby indicates the field intensity within cavity 12, and the provision for rotating the pickup loop 11 allows measurement of the maximum field intensity.

There is provided for the purpose of exciting the cavity 12 a second loop 17 which extends through the cavity wall and is electrically connected to a main oscillator 18 that energizes the loop 17. Main oscillator 18 itself produces a constant frequency signal that may, however, be adjusted by hand controls, and further includes appropriate circuitry to combine with the constant frequency signal an external signal for producing an output signal having either the sum or difference frequency of the two signals. The external signal is produced by a secondary or modulating oscillator 19 which has manual control means for adjusting the frequency of the output signal thereof. The cavity 12 will thus be seen to be excited by loop 17 with a signal having the combined frequency of the main oscillator signal and the secondary oscillator signal.

Very accurate measurement of changes in the frequency of the secondary oscillator signal is accomplished by the provision of a reference oscillator 21 which is provided with means for adjusting the signal frequency and which is designed to hold this adjusted frequency quite constant. The signals from secondary oscillator 19 and reference oscillator 21 are applied to a mixer circuit 22 that produces a signal having a beat frequency or a difference frequency between the frequencies of the input signals. This difference frequency signal, which is of a much lower order of frequency magnitude than the frequency of the input signals to the mixer circuit 22, is applied to a frequency meter 23 for measurement.

It is preferable to continuously record the difference frequency from mixer circuit 22 and thus a frequency meter 23 is employed that produces a signal having a magnitude proportional to the frequency of the input signal and this signal is applied to a chart recorder 24. Chart recorder 24 is calibrated by a chart calibrator 26 attached to the output of mixer circuit 22.

Figure 2:
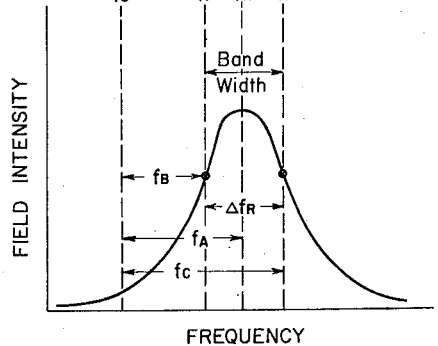
Figure 2 is a typical graph of field intensity vs. frequency for a resonant circuit or cavity.

With regard to a preferred mode of operation of the above-described circuit, the main oscillator 18 energizes the cavity 12 through loop 17 and the frequency of main oscillator 18 is manually adjusted until the cavity resonates ($f_R$ on Fig. 2). Resonance is observed on the meter 16 energized by pickup loop 11 through receiver 14 and is identified as the frequency at which a maximum field is established in the cavity, pickup loop 11 being rotated to insure that the maximum field is being measured. The frequency of the main oscillator is then adjusted to some value off resonance as, for example, by reducing the output frequency about five megacycles from a hundred megacycle resonant point ($f_0$ on Fig. 2). The secondary oscillator is then energized and the frequency thereof ($f_R$) is adjusted to again produce resonance in the cavity 12, this being at about five megacycles in the above example, inasmuch as the frequencies of the main and secondary oscillator signals are added together to produce the frequency of the cavity energizing signal. Reference oscillator 21 is energized and the frequency of the output signal thereof adjusted so that the difference frequency between it and the secondary oscillator frequency as produced by mixer circuit 22 will produce a midscale reading upon frequency meter 23. In practice, meter 23 may be an audio frequency meter, for with well-designed resonant circuits and/or cavities the bandwidth is quite small so as to easily fall within the audio range.

Having made the above measurements and adjustments, the bandwidth may then be readily determined by adjusting the frequency of secondary oscillator 19 to energize the cavity at first one .707 field intensity point ($f_1$) and then the other ($f_2$). The first point corresponds to a frequency of $f_B$ (Fig. 2) of secondary oscillator 19 and the second point corresponds to a secondary oscillator frequency of $f_C$ (Fig. 2) with the difference in frequency $f_1-f_2$ or $f_B-f_C$ being the bandwidth $\Delta f_R$ or frequency swing between the two points of .707 field intensity. As the frequency of reference oscillator 21 remains constant while the frequency of secondary oscillator 19 is varied between the above points, the variation in the reading of meter 23 is the change in frequency of the secondary oscillator or, in other words, frequency meter 23 shows the frequency change $f_B-f_C$ or $\Delta f_R$.

Figure 3:
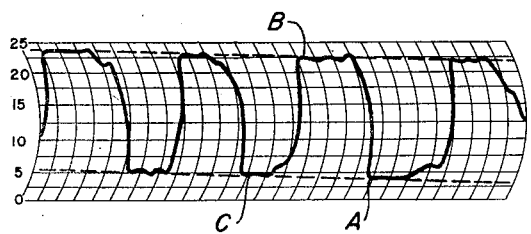
Figure 3 is a typical chart produced by the apparatus of Figure 1.

With the provision of a chart recorder 24 there is produced by the above-described operation a chart such as shown in Fig. 3, and referring thereto the vertical distances between A and B and between B and C are proportional to the bandwidth $\Delta f_R$. Inasmuch as frequency drift is quite common or at least not unexpected, it is desirable to provide means for counteracting same or for determining the effect thereof upon the accuracy of measurement, and in the present invention bandwidth readings are repeated two or more times to check the drift. If the vertical chart distance AB is equal to BC, etc., or if a line drawn along the top levels of the chart is parallel to a line drawn along the bottom levels then, at most, a linear frequency drift has occurred and the bandwidth has not changed during the measurements.

Following a determination of the bandwidth $f_R$ of the circuit or cavity in question the Q may then be readily calculated from the above relation $$Q = \frac{f_R}{\Delta f_R}$$

The measurement of the bandwidth $\Delta f_R$ will be seen to be readily accomplished with a high degree of accuracy by the present invention without regard to the magnitude of the resonant frequency so that a bandwidth of some thousand cycles may be determined to within a few cycles with a resonant frequency of the order of hundreds of megacycles or more.

It will be apparent from the foregoing that various modifications of the invention may be made within the spirit and scope thereof and thus the invention is not to be limited to the details of the illustrated embodiment except as defined in the following claims.

What is claimed is:

1. An improved method of measuring the bandwidth of a resonant cavity comprising the steps of energizing a resonant cavity with a main signal at resonant frequency, changing the frequency of said main signal off resonance, combining a secondary signal with said main signal to add the frequencies of the signals and energizing the cavity with the resultant signal, varying the frequency of said secondary signal to produce a resultant signal having a frequency at which said cavity resonates, producing a reference signal having a substantially constant frequency close to the adjusted frequency of said secondary signal, mixing said secondary and refernce signals to produce a beat frequency signal having a frequency equal to the difference in frequency of said secondary and reference signals, varying the frequency of said secondary signal to swing the resultant signal frequency between the .707 field intensity points of said cavity, and measuring the frequency change in said beat frequency signal as the bandwidth of said cavity.

2. A method of measuring the Q of a resonant cavity or circuit comprising the steps of measuring the excitation level in the cavity or circuit, energizing the circuit or cavity with a first signal and varying the frequency thereof to the maximum excitation level as indicated by the measuring step whereby said frequency is the resonant frequency, combining a second variable frequency signal with said first signal to produce an energizing signal having a frequency equal to the sum frequency of the first and second signals and varying the frequency of said second signal between the .707 maximum excitation levels as indicated by the measuring step, mixing with said second signal a reference signal having a constant frequency substantially equal to that of said second signal to produce a beat frequency signal, measuring the frequency variation in said beat frequency signal as the bandwidth of the cavity or circuit whereby Q is calculable from the measured resonant frequency divided by the measured bandwidth, and repeatedly varying the frequency of said second signal between the .707 maximum excitation levels to provide a plurality of measurable frequency changes whereby identity between the frequency variations establish the absence of non-linear frequency drift in the signals so that the bandwidth is properly indicated by the measurement of the beat frequency signal frequency variation.

References Cited in the file of this patent

UNITED STATES PATENTS

| | | |
|---|---|---|
| 2,351,548 | Schwartz et al. | June 13, 1944 |
| 2,671,198 | Beverly | Mar. 2, 1954 |
| 2,682,033 | Smullin | June 22, 1954 |

OTHER REFERENCES

Technique of Microwave Measurements, Montgomery, 1st ed., McGraw-Hill Book Co., 1947, pp. 396–403.